(12) United States Patent
Kawazu et al.

(10) Patent No.: US 7,289,173 B2
(45) Date of Patent: Oct. 30, 2007

(54) POLARIZING DEVICE, AND METHOD FOR MANUFACTURING THE SAME

(75) Inventors: Mitsuhiro Kawazu, Osaka (JP); Shinji Kawamoto, Osaka (JP); Hiroaki Yamamoto, Osaka (JP); Hideshi Nagata, Osaka (JP); Vladimir Victrovich Serikov, Osaka (JP); Hiroyuki Inomata, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 289 days.

(21) Appl. No.: 10/475,720

(22) PCT Filed: Jul. 27, 2001

(86) PCT No.: PCT/JP01/06512

§ 371 (c)(1),
(2), (4) Date: Jul. 8, 2004

(87) PCT Pub. No.: WO02/091044

PCT Pub. Date: Nov. 14, 2002

(65) Prior Publication Data

US 2004/0239833 A1 Dec. 2, 2004

(30) Foreign Application Priority Data

Apr. 26, 2001 (JP) ............................. 2001-129353

(51) Int. Cl.
*G02F 1/1335* (2006.01)
(52) U.S. Cl. ............................. 349/96; 349/97; 349/98; 349/99; 349/100; 349/101; 349/102; 349/103; 349/187

(58) Field of Classification Search .......... 349/96–103, 349/187
See application file for complete search history.

(56) References Cited

U.S. PATENT DOCUMENTS 5,521,726 A * 5/1996 Zimmerman et al. ......... 349/96

FOREIGN PATENT DOCUMENTS

| JP | 9-178943 A | 7/1997 |
|---|---|---|
| JP | 9-288211 A | 11/1997 |
| JP | 10-73722 A | 3/1998 |
| JP | 10-153706 A | 6/1998 |

\* cited by examiner

*Primary Examiner*—Andrew Schechter
*Assistant Examiner*—Thanh-Nhan (Nancy) P. Nguyen
(74) *Attorney, Agent, or Firm*—Cohen Pontani Lieberman & Pavane LLP

(57) ABSTRACT

A polarizing element 20 has a first undulating structure in which a plurality of linear first recesses 22 are formed parallel to one another in one surface of a transparent substrate 21, and a dielectric layer 30 made from silicon dioxide is formed on the surface of the first undulating structure to produce a second undulating structure. The second undulating structure has formed therein second recesses 32 having a width W and a depth H, with second projections 33 having a width d intervening between adjacent second recesses 32. A thin-film-shaped conductive body 13 of width W and depth H is embedded in each of the second recesses 32.

12 Claims, 7 Drawing Sheets

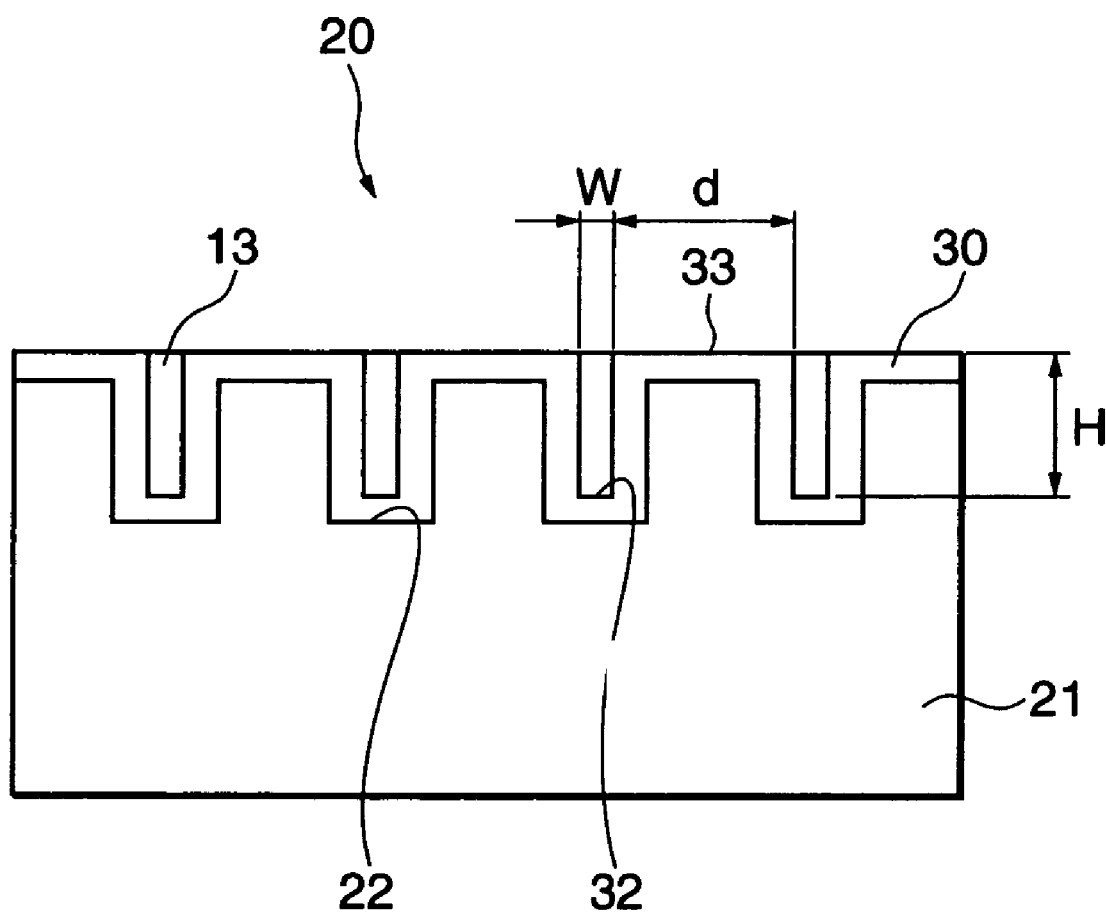

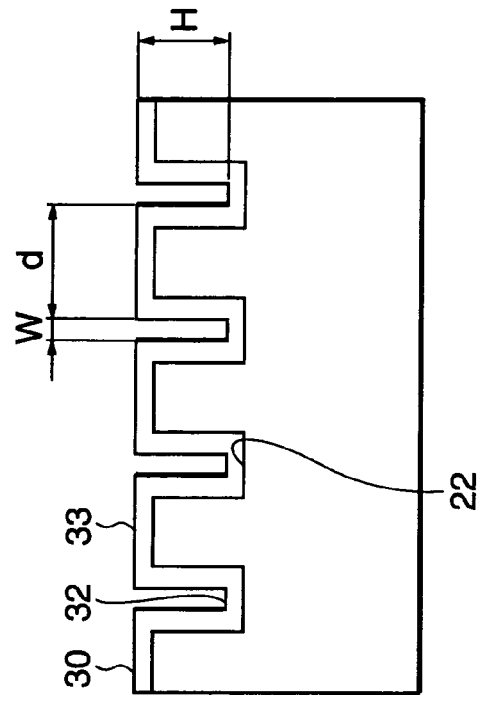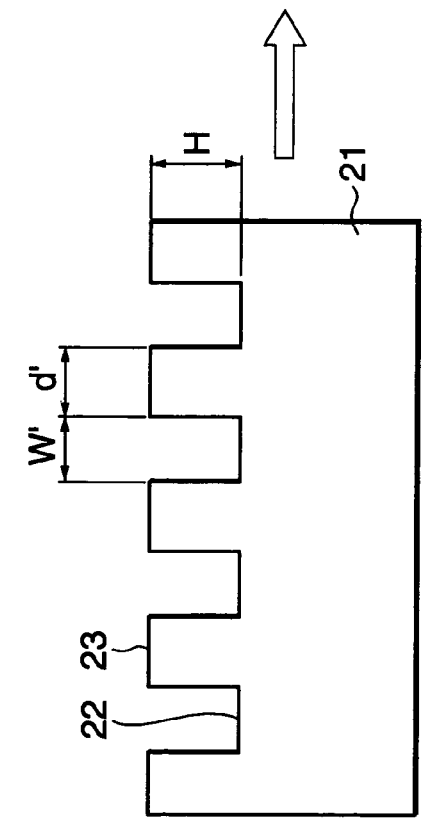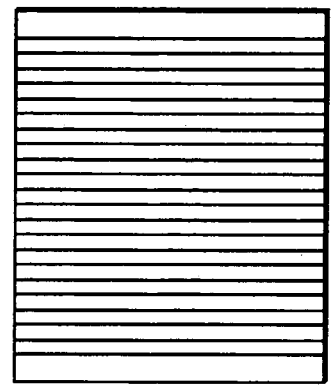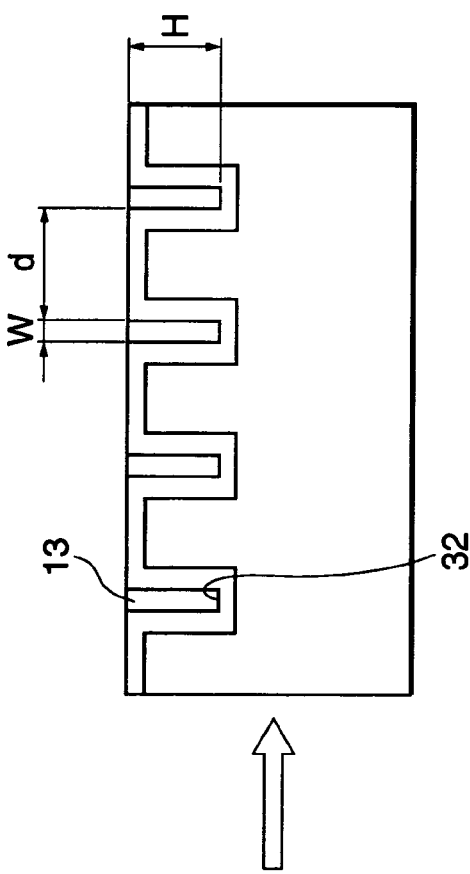

POLARIZING DEVICE, AND METHOD FOR MANUFACTURING THE SAME

This is a U.S. national stage of application No. PCT/JP01/06512, filed on 27 Jul. 2001.

TECHNICAL FIELD

The present invention relates to a polarizing element and a manufacturing method thereof.

BACKGROUND ART

Conventional polarizing elements include polarizing beam splitters that use a dielectric multilayer film, Rochon prisms and Glan-Thompson prisms that use a birefringent crystal, and linearly polarizing films that are manufactured by drawing an organic compound resin film in one direction, thus orienting iodine or a dichroic dye in a specific direction.

Moreover, a polarizing element characterized in that fine silver particles having shape anisotropy are precipitated and dispersed in glass is known (see, for example, New Glass, Vol. 12, No. 4, 1997, p 42). According to this polarizing element, glass in which fine silver halide particles have been dispersed is hot drawn, and as a result the fine silver halide particles are transformed into spheroids, and at the same time these spheroids are oriented such that the major axes thereof align with one another. The glass is next heated under a reducing atmosphere, whereupon the fine silver halide particles are reduced to fine silver particles, thus completing the manufacture of the polarizing element.

There is also a so-called "laminate type polarizing element" (see a catalog of optical polarization control elements of Sumitomo Osaka Cement Co., Ltd.). According to this laminate type polarizing element, a laminated structure is created in which metal or semiconductor thin film layers and dielectric layers are alternately arranged one upon another on a substrate of glass or the like in a vacuum environment using vacuum deposition, sputtering or the like, with a few tens of such layers being built up in total. The substrate and the laminated structure are next sliced to a thickness of about 30 μm in a direction orthogonal to the direction of lamination. The cut surfaces created by the slicing are then smoothed by polishing, thus completing the manufacture of the polarizing element.

Furthermore, a so-called "metallic grid polarizing element" in which a metallic grid is formed on the surface of a transparent substrate has been realized (see Japanese Laid-open Patent Publication (Kokai) No. 09-304620). This polarizing element is manufactured by forming a metallic film on a transparent substrate, and then forming a metallic grid either by dry etching the metallic film using a photolithographic technique or by a lift-off method.

However, in the case of the linearly polarizing film, manufacturing the film is cheap, but because the film is manufactured by drawing a resin film, there is a problem that heat resistance and wear resistance are poor compared with an inorganic compound type polarizing element.

Moreover, in the case of the polarizing element characterized by fine silver particles having shape anisotropy being precipitated and dispersed in glass, there is a problem that, during the step in which the glass is heated under a reducing atmosphere to reduce the fine silver halide particles to fine silver particles, the fine silver halide particles may return to a spherical shape and lose their shape anisotropy or the fine silver particles may shrink in volume, the result being that incident light is scattered and hence the insertion loss of incident light increases, and thus the stability of the polarization characteristics is poor. Furthermore, there is a problem that the effects of the treatment to reduce the silver halide to metallic silver only extend to a depth of a few tens of μm from the glass surface, and hence fine silver halide particles, which do not contribute to the polarization characteristics, remain. The presence of fine silver halide particles causes a rise in the incident light insertion loss, and also makes the manufacture of the polarizing element inefficient, hampering reduction of the cost of manufacturing the polarizing element.

Moreover, in the case of the laminate type polarizing element, the manufacturing process requires a lot of time and effort, resulting in the problem of it not being possible to reduce the manufacturing cost. Moreover, adhesion at the interfaces between the metal or semiconductor film layers and the dielectric layers is very poor, and hence there is a limit on the number of layers that can be built up. Furthermore, to keep down insertion loss of incident light, it is necessary to slice the substrate and the laminated structure to a thickness of about 30 μm or less and to smooth the cut surfaces created by the slicing by polishing. Besides, the laminated structure is prone to breaking during this processing, resulting in the problem of the product yield being very poor and hence the cost of the polarizing element being very high.

Moreover, in the case of the metallic grid polarizing element, the grid spacing must be made narrower than the wavelength of the polarized light used. For example, if an optical communication wavelength of 1.55 μm is to be handled, then microprocessing to form a grid in which the grid line width and the grid spacing are of a submicron order becomes necessary, but there are limits as to what is possible with photolithographic techniques. There is a problem that if either the grid line width or the grid spacing is larger than the designated value, then the incident light will be reflected from the metallic film, resulting in the insertion loss increasing and the polarization characteristics worsening. Moreover, the dry etching selectivity ratio of the metallic film (the rate of etching of the metallic film divided by the rate of etching of the photoresist) is low, resulting in the problem that it is difficult to achieve a thick metallic film, since to etch a thick metallic film the photoresist must also be made thick.

As a result, a metallic film of a thickness sufficient for fully realizing polarization characteristics cannot be achieved. For example, in tests to double check the polarization characteristics of a grid polarizing element that uses gold as disclosed in above-mentioned Japanese Laid-open Patent Publication (Kokai) No. 09-304620, it was found that the extinction ratio was about 20 dB, which does not sufficiently meet the performance required of an optical element such as a polarizing element.

In view of the above, it is an object of the present invention to provide a polarizing element that is inexpensive and has good polarization characteristics, and a method of manufacturing this polarizing element.

DISCLOSURE OF THE INVENTION

To attain the above object, a polarizing element according to the present invention, which absorbs a component of a specific wavelength from electromagnetic waves passing therethrough and thus produces polarized light, is characterized by comprising a transparent substrate that has a plurality of first recesses formed in a surface of the transparent substrate and extending parallel to one another with a predetermined spacing therebetween in a direction orthogonal to the surface of the transparent substrate, and a thin-film-shaped conductive body embedded in each of the first recesses.

Moreover, the polarizing element according to the present invention is characterized in that the thin-film-shaped conductive bodies are embedded in a plurality of second recesses formed in a dielectric material uniformly provided on the surface of the transparent substrate.

Furthermore, the polarizing element according to the present invention, which absorbs a component of a specific wavelength from electromagnetic waves passing therethrough and thus produces polarized light, is characterized by comprising a transparent substrate that has a plurality of first recesses formed in a surface of the transparent substrate and extending parallel to one another with a predetermined spacing therebetween in a direction orthogonal to the surface of the transparent substrate, and thin-film-shaped conductive bodies formed on side surfaces of the first recesses, wherein the following relationships are satisfied:

$0.1\lambda \leq d \leq 0.5\lambda$, $0.5d \leq H \leq 20d$ $0.06d \leq W \leq 1.5d$, and $1.0 \ \mu m \leq |\epsilon| \cdot W \cdot (H/d)$, where d represents the predetermined spacing between the conductive bodies, H a height of the conductive bodies, W a width of the conductive bodies, $|\epsilon|$ an absolute value of a complex relative permittivity of the conductive bodies, and $\lambda$ a polarized light wavelength, and units of d, W, and H are $\mu m$.

Moreover, the polarizing element according to the present invention, which absorbs a component of a specific wavelength from electromagnetic waves passing therethrough and thus produces polarized light, is characterized by comprising a transparent substrate and a plurality of thin-film-shaped conductive bodies arranged on a surface of the transparent substrate and extending parallel to one another with a predetermined spacing therebetween and in a direction orthogonal to the surface of the transparent substrate, and wherein the following relationships are satisfied:

$0.1\lambda \leq d < 0.5\lambda$, $0.5d < H \leq 20d$ $0.06d \leq W \leq 1.5d$, and $1.0 \ \mu m \leq |\epsilon| \cdot W \cdot (H/d)$, where d represents the predetermined spacing between the conductive bodies, H a height of the conductive bodies, W a width of the conductive bodies, $|\epsilon|$ an absolute value of a complex relative permittivity of the conductive bodies, and $\lambda$ a polarized light wavelength, and units of d, W, and H are $\mu m$.

Preferably, the polarizing element according to the present invention is characterized by satisfying the relationships:

$0.7d < H \leq 15d$, and $0.6d \leq W \leq 0.7d$.

More preferably, the polarizing element according to the present invention is characterized by satisfying the relationships:

$1.0d < H \leq 10d$, and $0.06d \leq W \leq 0.5d$.

Moreover, the polarizing element according to the present invention is characterized in that the conductive bodies comprise at least one selected from the group consisting of gold, silver, copper, palladium, platinum, aluminum, germanium, rhodium, silicon, nickel, cobalt, manganese, iron, chromium, titanium, ruthenium, niobium, neodymium, ytterbium, yttrium, molybdenum, indium, and bismuth.

To attain the above object, a method of manufacturing a polarizing element, which absorbs a component of a specific wavelength from electromagnetic waves passing therethrough and thus produces polarized light, according to the present invention is characterized by comprising a first undulating structure forming step of forming, in a surface of a transparent substrate, a first undulating structure having a plurality of linear first recesses extending parallel to one another with a predetermined spacing therebetween, a second undulating structure forming step of depositing a dielectric material to an approximately uniform thickness onto the first undulating structure using a liquid phase deposition method, thus forming a second undulating structure having a plurality of second recesses having a width narrower than the width of the first recesses of the first undulating structure, and a conductor embedding step of embedding a conductor into the second recesses.

Moreover, the method of manufacturing a polarizing element according to the present invention is characterized in that the liquid phase deposition method in the second undulating structure forming step comprises bringing the first undulating structure into contact with a hydrosilicofluoric acid solution in which silicon dioxide has been dissolved to a supersaturated extent, thus depositing silicon dioxide on a surface of the first undulating structure.

BRIEF DESCRIPTION OF THE DRAWINGS

FIG. 4 is a front view of a variation of the polarizing element shown in FIG. 1;

FIGS. 5A to 5D are views useful in explaining steps of manufacturing the polarizing element shown in FIG. 4; specifically:

FIG. 5A shows a transparent substrate processing step;

FIG. 5B shows a dielectric material forming step;

FIG. 5C shows a conductor embedding step;

FIG. 5D shows the completed polarizing element;

BEST MODE FOR CARRYING OUT THE INVENTION

Polarizing elements according to embodiments of the present invention will now be described in detail with reference to the drawings.

Figure 1:
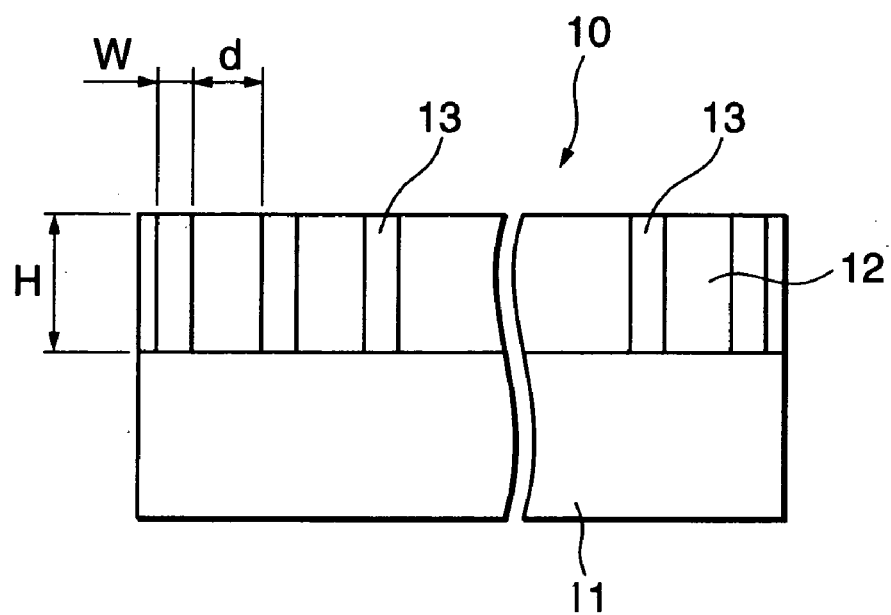
FIG. 1 is a front view of a polarizing element according to a first embodiment of the present invention.
Figure 2:
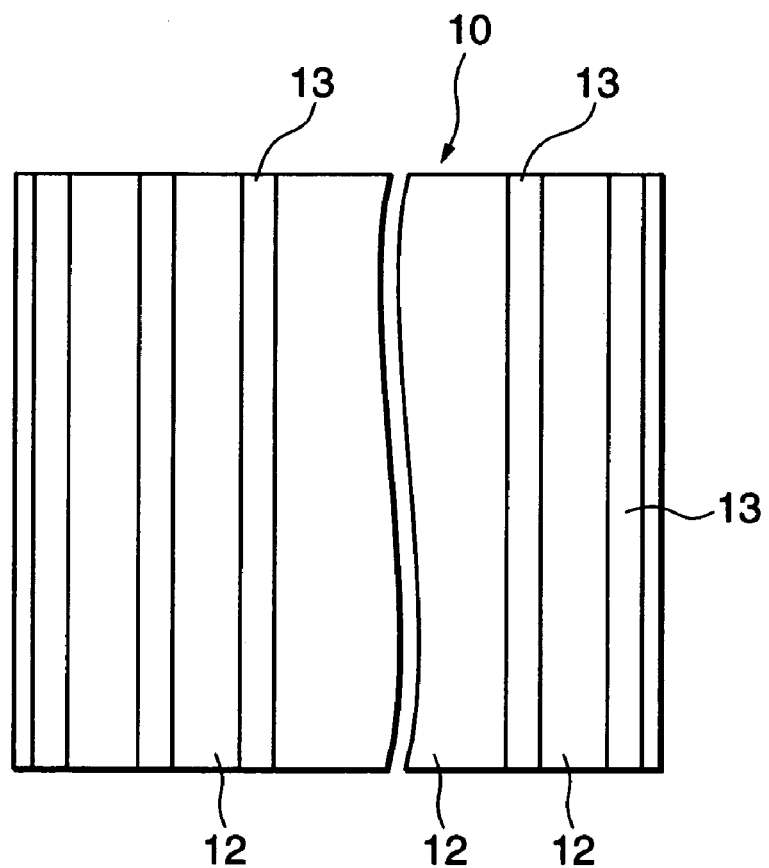
FIG. 2 is a top plan view of the polarizing element shown in FIG. 1.

FIG. 1 is a front view of a polarizing element according to a first embodiment of the present invention, and FIG. 2 is a top plan view of the polarizing element shown in FIG. 1.

In the polarizing element 10 according to the first embodiment, a dielectric material 12 is provided on a transparent substrate 11. A plurality of thin-film-shaped conductive bodies 13 of width W and height H are erected on the transparent substrate 11 in a manner extending parallel to one another with a predetermined spacing d therebetween, and are held in place by the dielectric material 12.

The transparent substrate 11 should be a substrate that is transparent at the polarized light wavelength used, and may be, for example, a glass substrate, a resin substrate, a single crystal substrate or the like.

Many types of glass may be used for glass substrates, including soda lime glass, aluminosilicate glass, borosilicate glass and quartz glass, and a suitable glass may be chosen from these in accordance with the use of the polarizing element 10. Of these types of glass, quartz glass has a high light transmittance over a range right from ultraviolet rays to near infrared rays, and thus is particularly suitable in the case that the polarizing element 10 is used with light of a wavelength used in optical communication (1.55 μm). Moreover, quartz glass is also preferable in the sense that it can easily be subjected to surface microprocessing techniques such as laser abrasion and dry etching.

When the polarizing element 10 is used with light of a wavelength used in optical communication, as well as a quartz glass substrate, a gallium-arsenic single crystal substrate can also be used as the transparent substrate 11.

Moreover, in the case that a transparent substrate other than a quartz glass substrate is used, a silicon dioxide (quartz) coating film may be formed to a thickness of a few μm on the surface of the transparent substrate. In the polarizing element 10, only the part up to a few μm from the surface of the transparent substrate 11 is made to exhibit polarization characteristics, and hence if this part has the same properties as quartz glass, then it will be just as easy to apply surface microprocessing techniques as described above as in the case of a quartz glass transparent substrate.

It should also be noted that, depending on the use of the polarizing element, a transparent resin substrate of an acrylic resin, a polycarbonate resin or the like may be used instead of the transparent substrates described above.

The plurality of thin-film-shaped conductive bodies 13 erected on the surface of the transparent substrate 11, namely, arranged in a fashion extending orthogonally to the above-mentioned surface, are fixed in contact with the transparent substrate 11 or the dielectric material 12. As a result, the thin-film-shaped conductive bodies 13 do not separate away from the transparent substrate 11 and can maintain good adhesion at the interfaces between the conductive bodies 13 and the transparent substrate 11 or the dielectric material 12 without giving any special consideration. The thin-film-shaped conductive bodies 13, which give rise to the polarization characteristics, can thus be fixed in predetermined positions, and as a result stable polarization characteristics can be realized. Moreover, the thin-film-shaped conductive bodies 13 do not break easily upon being subjected to various external forces during subsequent manufacturing steps such as machining and assembly.

The material that comes into contact with and fixes the conductive bodies 13 in place preferably has a refractive index the same or almost the same as that of the transparent substrate 11. This is to correct the phase of the light that passes through the polarizing element 10. This material is thus preferably the same kind of material as that from which the transparent substrate 11 is made. In the case that a material different to that from which the transparent substrate 11 is made is used as the dielectric material 12, it is preferable to select a material having a refractive index close to that of the transparent substrate 11.

It should also be noted that the material that fixes the conductive bodies 13 in place may instead be another transparent solid, for example a curable transparent resin such as an adhesive, rather than the transparent substrate 11 or the dielectric material 12.

A description will now be given of the polarizing capability of the polarizing element 10 with reference to FIG. 3.

Figure 3:
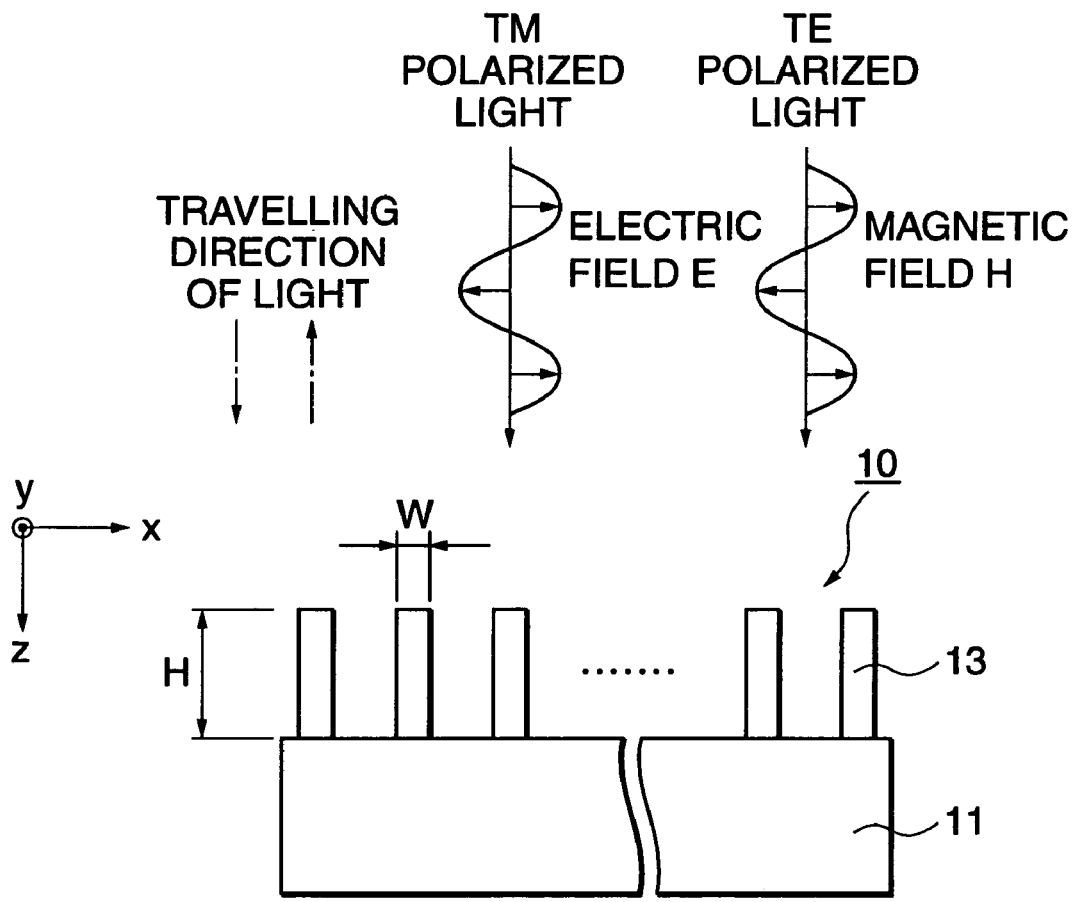
FIG. 3 is a front view of the polarizing element 10 shown in FIG. 1 with the dielectric material 12 omitted from the drawing.

FIG. 3 is a front view of the polarizing element 10 shown in FIG. 1 with the dielectric material 12 omitted from the drawing.

Out of the light incident on the polarizing element 10, TE polarized light (electric field waves) of which the wavefronts are parallel to the side faces of the conductive bodies 13 and the electric field is parallel to the y-direction in FIG. 3 are reflected by the polarizing element 10, whereas TM polarized light of which the wavefronts are perpendicular to the side faces of the conductive bodies 13 and the electric field is parallel to the x-direction in FIG. 3 is transmitted by the polarizing element 10.

With regard to the TE polarized light, relative to the wavelength, the conductive bodies 13 have a length (the height H in FIG. 3) such that they act substantially as conductors, and hence transient currents flow through the conductive bodies 13. As a result, reflection and absorption properties similar to those of a metal surface are obtained, and hence the TE polarized light does not pass through the polarizing element 10.

With regard to the TM polarized light, on the other hand, the length of the conductive bodies 13 (the width W in FIG. 3) is short compared with the wavelength, and hence the conductive bodies 13 do not act substantially as conductors, resulting in no transient currents flowing through the conductive bodies 13. The TM polarized light thus passes through the polarizing element 10.

The extinction ratio and the insertion loss are generally used as characteristics for evaluating the polarizing capability of a polarizing element.

The extinction ratio is defined as in the following formula from the ratio of the transmittance $T_{TM}$ of the TM polarized light (which is transmitted in a more amount) to the transmittance $T_{TE}$ of the TE polarized light (which is transmitted in a less amount) for the case that linearly polarized light is incident on the polarizing element:

$$\text{Extinction ratio (dB)} = 10\_\log_{10}(T_{TM}/T_{TE})$$

The insertion loss is defined as in the following formula from the transmittance $T_{TM}$ of the TM polarized light (which is transmitted in a more amount than the TE polarized light) for the case that linearly polarized light is incident on the polarizing element:

$$\text{Insertion loss (dB)} = -10\_\log_{10}(T_{TM}/100),$$

where $T_{TM}$ is expressed as a percentage.

The higher the extinction ratio and the lower the insertion loss, the better the polarization characteristics of the polarizing element.

A description will now be given of the shape that the conductive bodies 13 should have for good polarization characteristics to be exhibited for a given polarized light wavelength, i.e. the values that the width W, the height H and the predetermined spacing d should take.

It is desirable for the shape of the conductive bodies 13 to be determined based on the polarized light wavelength used. It is desirable for the predetermined spacing d between the conductive bodies 13 erected on the transparent substrate 11 to be as follows relative to the wavelength $\lambda$:

$$0.1\lambda \leq d < 0.5\lambda$$

If the predetermined spacing d is greater than 0.5λ, then, relative to the polarized light wavelength λ used, there will not be enough conductive bodies 13 to contribute to the reflection and absorption of the TE polarized light. As a result, the transmittance of the TE polarized light will be high, and hence the polarizing element 10 will no longer function properly.

The lower the predetermined spacing d, the larger the polarized light separation effect, but if d is less than 0.1λ, then reflection and absorption of the TM polarized light that should be transmitted will increase, that is, the insertion loss of the incident light will increase, and hence the performance of the polarizing element 10 will drop. Moreover, with regard to the structure of the polarizing element 10 shown in FIG. 1, if the predetermined spacing d is less than 0.1λ, then it will be difficult to arrange the conductive bodies 13, which is undesirable from an industrial point of view.

Moreover, the height H of the conductive bodies 13 relative to the predetermined spacing d between the conductive bodies 13 is preferably 0.5d<H≦20d, more preferably 0.7d<H≦15d, yet more preferably 1.0d<H≦10d.

It is preferable for the height H of the conductive bodies 13 to be so high that the conductive bodies 13 act substantially as conductors in the travelling direction of the incident linearly polarized light. That is, it is preferable for the height H to be so high that transient currents flow when the conductive bodies 13 receive the TE polarized light, resulting in reflection and absorption properties similar to those of a metal surface being obtained, and hence the TE polarized light not being transmitted.

If the height H is less than 0.5d, then the conductive bodies 13 do not act substantially as conductors in the travelling direction of the incident linearly polarized light, and hence a sufficient extinction ratio cannot be obtained.

Moreover, the extinction ratio can be made larger by making the height H larger, but once the height H exceeds 20d, the extinction ratio no longer increases. Moreover, it is not practicable to form conductive bodies having a height H greater than 20d with current techniques, and hence it is preferable for the height H to be no more than 20d from an industrial point of view.

The width W of the conductive bodies 13 relative to the predetermined spacing d between the conductive bodies 13 is preferably 0.06d≦W≦1.5d, more preferably 0.06d≦W≦0.7d, yet more preferably 0.06d≦W≦0.5d.

As the width W of the conductive bodies 13 becomes smaller relative to the predetermined spacing d, the insertion loss drops, but if the width W is less than 0.06d, then a sufficiently large extinction ratio can no longer be obtained. Moreover, to make the width W less than 0.06d, the thin-film-shaped conductive bodies 13 must be made extremely thin. It is difficult and impracticable to do this.

As the width W becomes larger relative to the predetermined spacing d, the extinction ratio rises, but it is undesirable for the width to exceed 1.5d, since in this case reflection and absorption of the TM polarized light which should be transmitted increases and hence the insertion loss of the incident light increases.

The physical properties of the conductive bodies 13 greatly affect the polarization characteristics of the polarizing element 10 obtained. In particular, the conductivity and relative permittivity of the conductive bodies 13 contribute to the polarization characteristics; the larger the conductivity and relative permittivity, the greater the function of reflecting and absorbing the TE polarized light, and hence the larger the extinction ratio and the better the polarization characteristics.

The absolute value |ε| of the complex relative permittivity can be used as a physical quantity that represents both the conductivity and the relative permittivity, in which case a polarizing element having a large extinction ratio is obtained when conductive bodies having a large value of |ε| are used. As described above, the shape of the conductive bodies 13, i.e. the width W, the height H and the predetermined spacing d, and the physical property value |ε| are factors that determine the polarization characteristics. It is not the case that any one of these factors alone determines the polarization characteristics.

By setting the shape of the conductive bodies 13 in accordance with the polarized light wavelength used with the polarizing element 10, i.e. setting relationships between W, H, d and λ, and moreover setting a suitable relationship between the shape parameters W, H and d and the physical property value |ε| of the conductive bodies 13, optimum characteristics can be obtained for the polarized light wavelength used with the polarizing element 10.

Specifically, it is preferable for the shape parameters W, H and d and the physical property value |ε| of the conductive bodies 13 in the polarizing element 10 to satisfy the following relationship:

$$1.0\ \mu m \leq |\epsilon|\_W\_(H/d)$$

For example, in the case that conductive bodies 13 having a low value of |ε| are used, if a shape is adopted for which at least one of W and H/d is large, then the polarizing element 10 will have sufficient characteristics for practical purposes. Moreover, in the case that conductive bodies 13 having a high value of |ε| are used, at least one of W and H/d may be made small.

As described above, the polarizing element 10 can thus be produced in such a way as to realize the optimum characteristics for the polarized light wavelength used.

The material of the conductive bodies 13 is preferably at least one selected from the group consisting of gold, silver, copper, palladium, platinum, aluminum, germanium, rhodium, silicon, nickel, cobalt, manganese, iron, chromium, titanium, ruthenium, niobium, neodymium, ytterbium, yttrium, molybdenum, indium, and bismuth.

Moreover, the material of the conductive bodies 13 is more preferably at least one selected from the group consisting of gold, silver, copper, aluminum, palladium, rhodium, nickel, cobalt, and chromium.

The above metallic materials have high conductivities and relative permittivities, even relative to other metallic materials. If such metallic materials are used for the conductive bodies 13 of the polarizing element 10, then the characteristics of reflection and absorption of light incident on the polarizing element 10 are improved, and hence the polarization characteristics of the polarizing element 10 can be improved.

FIG. 4 is a front view of a variation of the polarizing element shown in FIG. 1.

In FIG. 4, constituent elements equivalent to constituent elements in FIG. 1 are designated by the same reference numerals.

The polarizing element 20 has an undulating structure (hereinafter referred to as the "first undulating structure") in which a plurality of linear first recesses 22 are formed parallel to one another in one surface of a transparent substrate 21. A dielectric layer 30 made from silicon dioxide is formed on the surface of the first undulating structure. This dielectric layer 30 is formed to approximately the same thickness in all places over the surface of the first undulating structure, and hence the surface outline thereof also has an undulating structure (hereinafter referred to as the "second undulating structure"). Recesses 32 (hereinafter referred to as the "second recesses 32") of the second undulating structure have a width W and a depth H. Moreover, projecting parts 33 (hereinafter referred to as the "second projections 33") have a width d. A thin-film-shaped conductive body 13 of width W and height H is embedded in each of the second recesses 32.

A description of a method of manufacturing the polarizing element shown in FIG. 4 will now be given with reference to FIGS. 5A to 5D.

FIGS. 5A to 5D are views useful in explaining steps of manufacturing the polarizing element shown in FIG. 4. Specifically, FIG. 5A shows a transparent substrate processing step, FIG. 5B shows a dielectric forming step, FIG. 5C shows a conductor embedding step, and FIG. 5D shows the completed polarizing element.

First, as shown in FIG. 5A, the linear first recesses 22 are formed in an upper part of the transparent substrate 21. To form these first recesses 22, there may be used a method of carrying out light exposure using a photolithography exposure technique, an electron beam drawing technique, a laser drawing technique, a laser two-beam interference exposure technique or the like, and then carrying out dry etching or wet etching. Moreover, laser abrasion or pattern transfer using a press, which allow formation of a fine first undulating structure, may also be used.

By using such a method, first recesses 22 having a width W' and a depth H, and first projections 23 having a width d', are formed.

Next, as shown in FIG. 5B, a dielectric layer 30 formed of a silicon dioxide is formed on the surface of the first undulating structure.

The formation of the dielectric layer 30 is carried out by liquid phase deposition. Specifically, the transparent substrate 21 is brought into contact with a hydrosilicofluoric acid ($H_2SiF_6$) solution containing silicon dioxide to a supersaturated extent (hereinafter referred to as the 'treatment solution'), thus depositing the silicon dioxide component in the treatment solution onto the surface of the transparent substrate 21.

The treatment solution is, for example, prepared by dissolving a substance containing silicon dioxide such as silica gel or silica glass approximately to saturation in a hydrosilicofluoric acid solution, and then either adding water or a reagent (such as boric acid or metallic aluminum) or else raising the temperature of the approximately saturated hydrosilicofluoric acid solution, thus making the silicon dioxide be contained to a supersaturated extent.

In the case that a resin substrate is used as the transparent substrate 21, a coating film of an organosilicic compound having an organic functional group such as a methacryloxy group or an amino group is formed before carrying out the silicon dioxide deposition; when the silicon dioxide deposition is subsequently carried out, a silicon dioxide coating film that adheres strongly to the resin substrate can thus be formed.

Through this liquid phase deposition, silicon dioxide is isotropically deposited at the same deposition rate on all of the bottom surface and side surfaces of each of the first recesses 22 and the top surface of each of the first projections 23. The width W of the second recesses 32 after the formation of the dielectric layer 30 is thus less than the width W' of the first recesses 22 initially formed in the upper part of the transparent substrate 21, whereas the depth H of the second recesses 32 is the same as the depth H of the first recesses 22. Furthermore, the spacing d between adjacent conductive bodies 13 is larger than the width d' of the first projections 23.

Through this liquid phase deposition, the width of the second recesses 32 can thus be made extremely narrow, and groove shapes of depth 15 times this width can easily be formed.

After the dielectric layer 30 has been formed, the conductive bodies 13 are embedded into the second recesses 32 as shown in FIG. 5C. Electroless deposition is suitable as a method for doing this.

Alternatively, the embedding of the conductive bodies 13 into the second recesses 32 may be carried out by applying a solution containing a conductor raw material onto the dielectric layer 30 and then heating. Methods of applying the solution containing the conductor raw material include casting, dip coating, gravure coating, flexographic printing, roll coating, spraying, and spin coating.

When this method is used, some of the conductor remains on the surfaces of the second projections 33, and if the situation is left like this, then the insertion loss of the polarizing element 20 will increase. To prevent this, after the embedding of the conductive bodies 13, the conductor remaining on the surfaces of the second projections 33 is removed by polishing, etching, or wiping with a cloth or the like.

The conductive bodies 13 formed in this way have, for example, a width W of 0.1 μm, a height H of 1.5 μm, and a spacing d of 0.5 μm. To form conductive bodies 13 having such a shape in the second recesses 32, the width W of the second recesses 32 must be 0.1 μm, the depth H of the second recesses 32 must be 1.5 μm, and the spacing d must be 0.5 μm.

By following the procedure described above, a polarizing element 20 as shown in FIG. 5D is manufactured.

Note that in the case that the width of the second recesses 32 is large and the depth is low, CVD, vacuum deposition, sputtering or the like may be used to form the conductive bodies 13.

Moreover, by forming a layer having an antireflective function on the surfaces of the conductive bodies 13, the insertion loss can be reduced, and hence a polarizing element 20 having improved polarization characteristics can be manufactured.

Using the manufacturing method described above, it is easy to manufacture a polarizing element having an extinction ratio of at least 25 dB and an insertion loss of no more than 1.0 dB.

Moreover, it is also possible to manufacture a yet more preferable polarizing element having an extinction ratio of at least 30 dB and an insertion loss of no more than 1.0 dB.

It should also be noted that, although a description has just been given of a manufacturing method in which a layer of a dielectric 30 is formed after the first recesses 22 have been formed in an upper part of the transparent substrate 21, it is also possible to omit the formation of the dielectric layer 30, simply forming the first recesses 22 to a narrow width in the first manufacturing step and then embedding the conductive bodies 13 directly into the first recesses 22.

Figure 6:
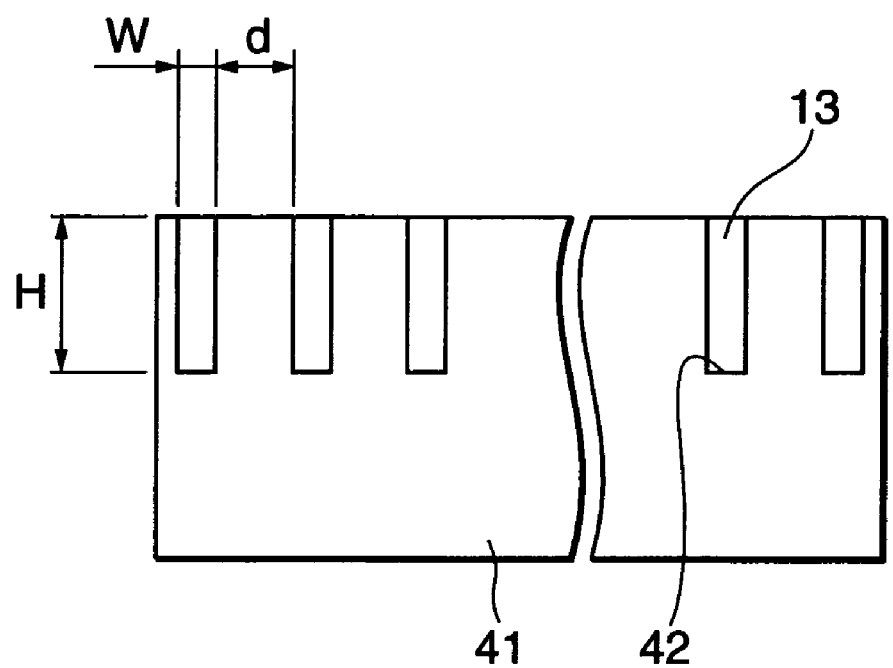
FIG. 6 is a front view of a polarizing element according to a second embodiment of the present invention.

FIG. 6 is a front view of a polarizing element according to a second embodiment of the present invention.

A plurality of linear first recesses 42 are formed parallel to one another in an upper part of a transparent substrate 41 by carrying out, for example, light exposure and dry etching. Conductive bodies 13 are then directly embedded into these first recesses 42. The width and height of the conductive bodies 13 are denoted by W and H respectively, and the separation between adjacent conductive bodies 13 is denoted by d.

Figure 7:
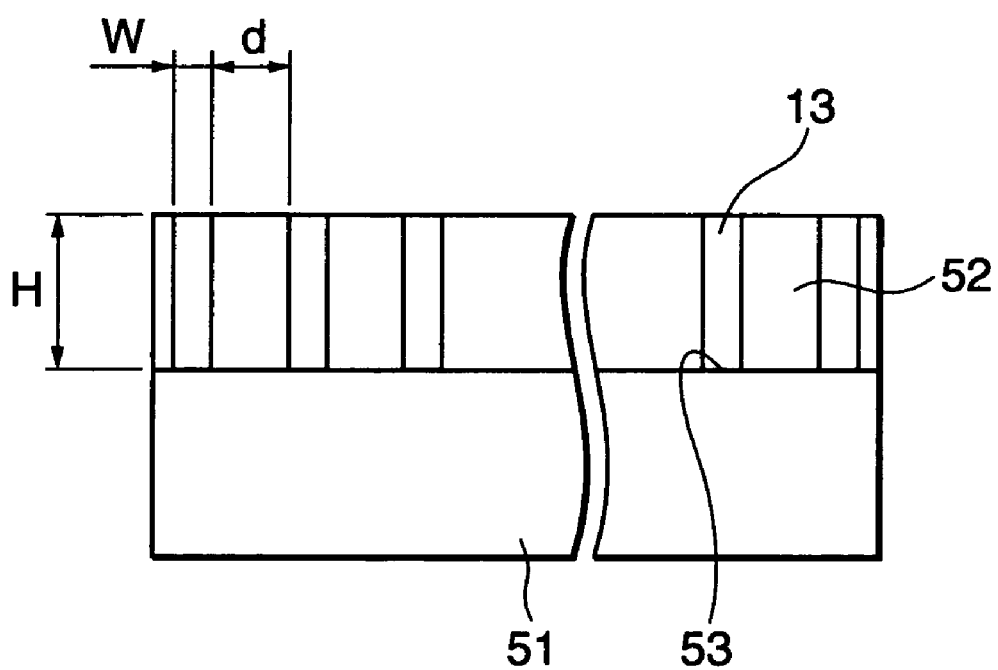
FIG. 7 is a front view of a polarizing element according to a third embodiment of the present invention.

FIG. 7 is a front view of a polarizing element according to a third embodiment of the present invention.

At the top of a transparent substrate 51, a plurality of linear grooves 53 are formed parallel to one another in the surface of a dielectric 52 by carrying out, for example, light exposure and dry etching. The dielectric 52 is made of silicon dioxide or the like and is formed to a thickness of a few μm on the transparent substrate 51, and the conductive bodies 13 are embedded into the grooves 53 formed in the dielectric 52. The width and height of the conductive bodies 13 are denoted by W and H respectively, and the separation between adjacent conductive bodies 13 is denoted by d. Each of the conductive bodies 13 is made to be in contact with the dielectric 52.

Figure 8:
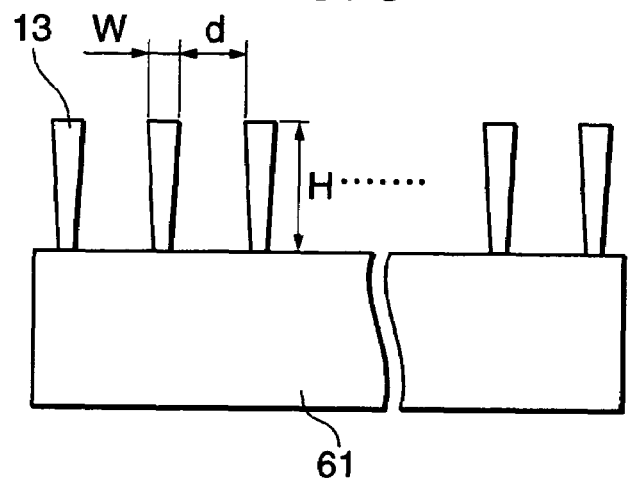
FIG. 8 is a front view of a polarizing element according to a fourth embodiment of the present invention.

FIG. 8 is a front view of a polarizing element according to a fourth embodiment of the present invention.

Conductive bodies 13 are formed in thin film shapes of a thickness of a few μm on top of a transparent substrate 61 by carrying out, for example, light exposure and dry etching.

Figure 9:
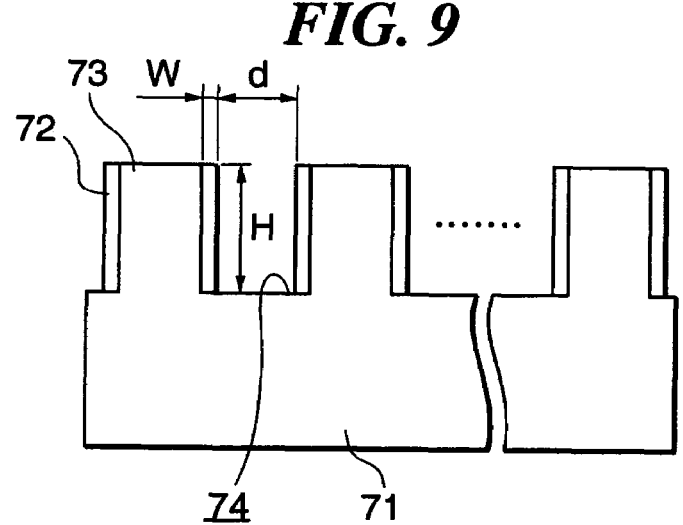
FIG. 9 is a front view of a polarizing element according to a fifth embodiment of the present invention.

FIG. 9 is a front view of a polarizing element according to a fifth embodiment of the present invention.

A first undulating structure comprised of a plurality of linear first recesses 74, and a plurality of linear first projections 73 is formed in an upper part of a transparent substrate 71 by carrying out, for example, light exposure and dry etching. Conductive bodies 72 are formed on the side surfaces of the first projections 73. These conductive bodies 72 are formed by forming a conductive film by electroless deposition or the like over the whole surface of the first undulating structure, and then removing parts of the conductive film formed on the top surfaces of the first projections 73 and parts of the conductive film formed on the bottom surfaces of the first recesses 74 using highly directional (anisotropic) etching (for example reactive ion etching using $CF_6$ gas). The width and height of the conductive bodies 72 are denoted by W and H respectively, and the separation between adjacent conductive bodies 72 is denoted by d. The conductive bodies 72 rise up from the bottom surfaces of the first recesses 74.

Figure 10:
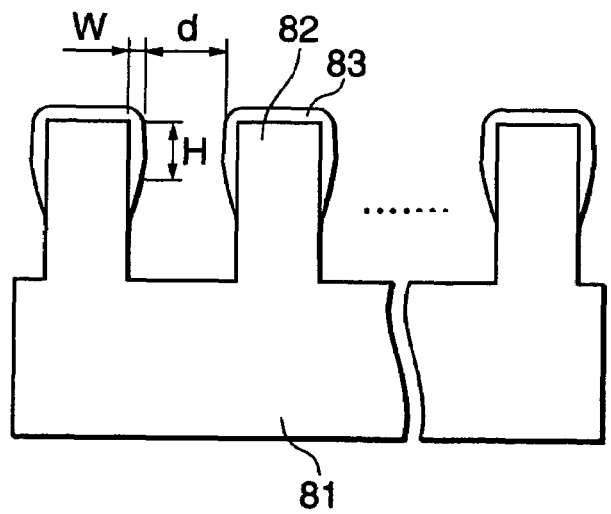
FIG. 10 is a front view of a polarizing element according to a sixth embodiment of the present invention.

FIG. 10 is a front view of a polarizing element according to a sixth embodiment of the present invention.

A first undulating structure including a plurality of linear first projections 82 is formed in an upper part of a transparent substrate 81 by carrying out, for example, light exposure and dry etching. A conductive body 83 is formed on the top surface of each first projection 82, extending downward along parts the side surfaces of the first projection 82. These conductive bodies 83 are formed by carrying out sputtering, CVD or the like from above the first projections 82. The width and height of the conductive bodies 83 are denoted by W and H respectively, and the separation between adjacent conductive bodies 83 is denoted by d.

Figure 11:
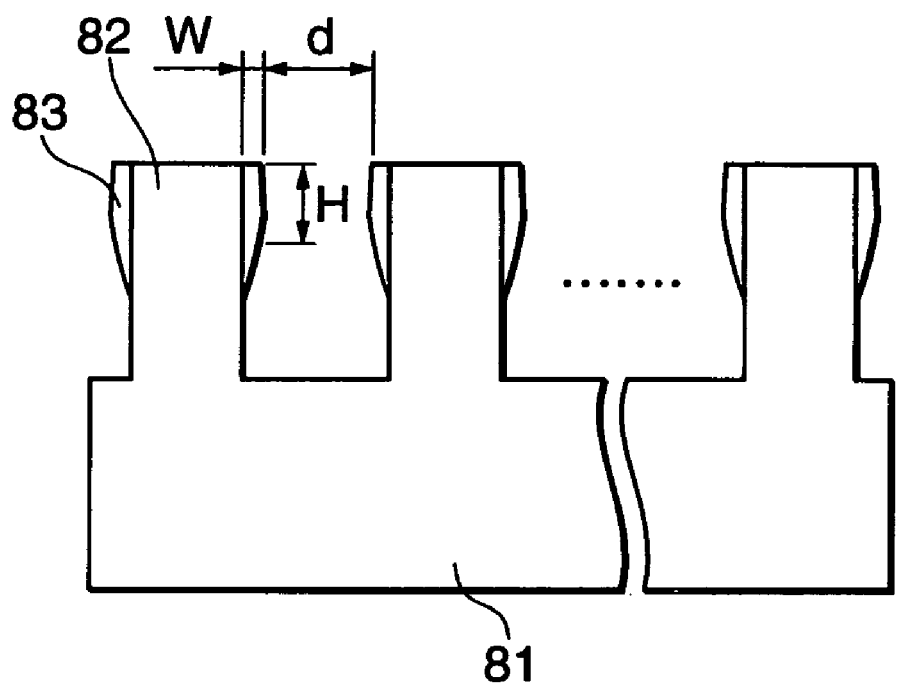
FIG. 11 is a front view of a polarizing element according to a seventh embodiment of the present invention.

FIG. 11 is a front view of a polarizing element according to a seventh embodiment of the present invention.

The polarizing element of this embodiment is the same as that of the sixth embodiment, except that parts of the conductive bodies 83 on the top surfaces of the first projections 82 are removed by polishing or the like, thus improving the insertion loss.

Figure 12:
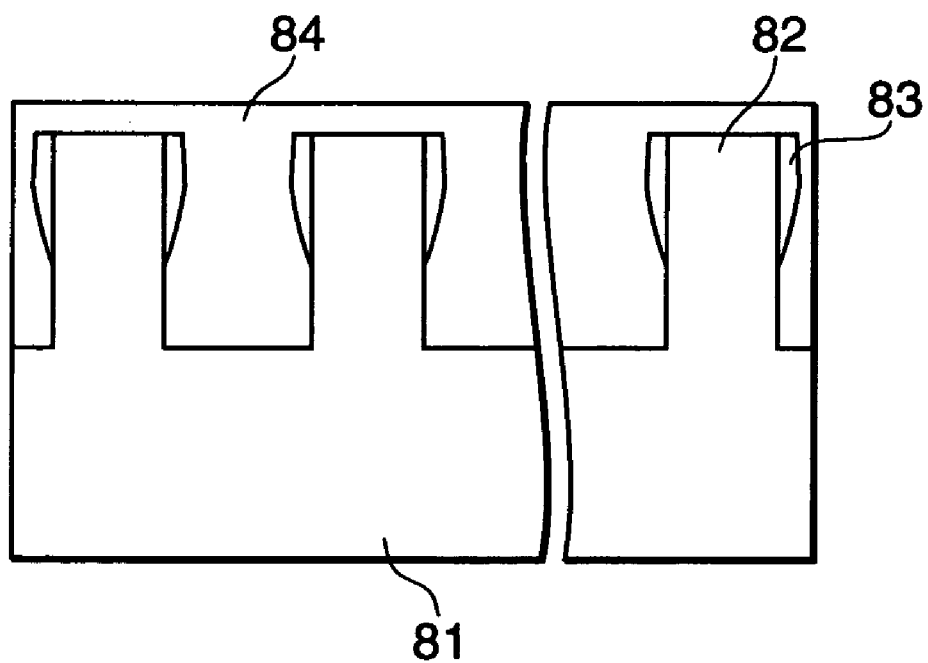
FIG. 12 is a front view of a polarizing element according to an eighth embodiment of the present invention.

FIG. 12 is a front view of a polarizing element according to an eighth embodiment of the present invention.

The polarizing element of this embodiment is formed by taking the polarizing element of the seventh embodiment and covering the whole of the undulating structure with a dielectric 84 so as to protect the conductive bodies 83 and also correct the phase of the transmitted light. The dielectric 84 has a refractive index approximately the same as that of the transparent substrate 81. This dielectric 84 is formed, for example, by applying a sol-type coating liquid having an organosilicic compound such as an alkoxysilane as a principal component thereof over the whole of the undulating structure, and then carrying out heat treatment so as to gelate and thus solidify the sol-type coating liquid.

As described above, according to the polarizing element of the present invention, the thickness of the transparent substrate surface structure for producing the polarization characteristics can be made sufficiently thin so as to be of approximately the same order as the polarized light wavelength used, and hence it is easy to make a thin polarizing element.

Moreover, the structure for producing the polarization characteristics is formed on the surface of the polarizing element, and hence a polarizing element having a large surface area can easily be obtained.

Furthermore, a large number of polarizing elements can be manufactured at a time by cutting a polarizing element having a large surface area into many parts each having a predetermined size, and hence it is easy to promote cost reduction of polarizing elements.

EXAMPLES

Example 1

A piece of quartz glass of dimensions 100 mm×100 mm×2.1 mm was prepared as a transparent substrate. A photoresist was applied onto this transparent substrate, He—Cd laser two-beam interference exposure was carried out, and then an undulating structure having linear grooves of width (W') 0.30 μm and depth (H) 1.5 μm extending parallel to one another with a spacing (d') of 0.30 μm therebetween was formed using reactive ion etching.

Next, a silicon dioxide layer of thickness 0.10 μm was formed over the whole surface of the undulating structure by carrying out liquid phase deposition using a hydrosilicofluoric acid solution containing silicon dioxide to a supersaturated extent (treatment solution), thus forming an undulating structure in which the thickness was 0.10 μm, the width (W) of the recesses was 0.1 μm, the depth (H) of the recesses was 1.5 μm, and the spacing (d) between adjacent recesses was 0.5 μm.

In the liquid phase deposition in the present example, the concentration of the hydrosilicofluoric acid was 2.5 mol/l and the temperature of the treatment solution was 35° C.

Next, gold was embedded as a conductor into the recesses of the undulating structure using electroless deposition. Excess gold that formed on the top surfaces of the projections of the undulating structure was removed using a polishing apparatus.

As a result of the above, a polarizing element was produced in which thin gold films of width (W) 0.1 μm and height (H) 1.5 μm rose up with a spacing (d) of 0.5 μm therebetween from the surface of a piece of quartz glass, with the thin gold films being in contact with a silicon dioxide layer.

When manufacturing the polarizing element as described above, the shape of the undulating structure and the shape of the conductive bodies were measured by manufacturing another sample by carrying out the same processes and then viewing the cross section of this sample using a scanning electron microscope (SEM).

The polarization characteristics of the polarizing element were evaluated using light of wavelength 1.55 μm, whereupon the extinction ratio was found to be 52.3 dB and the insertion loss 0.13 dB. The extinction ratio and the insertion loss were evaluated following the definitions given earlier.

Moreover, it should be noted that there was no peeling away whatsoever at either the interfaces between the gold and the silicon dioxide or the interface between the quartz glass and the silicon dioxide.

Examples 2 to 10

Using pieces of quartz glass of dimensions 100 mm×100 mm×2.1 mm as in Example 1, polarizing elements having conductive bodies of different types and shapes as shown in Table 1 were manufactured using the same procedure as in Example 1.

In Table 1, each of the predetermined spacing d, the height H, the width W and the parameter $|\epsilon|\_W\_(H/d)$ has the units μm.

Table 2 shows the characteristics (extinction ratio and insertion loss) of the polarizing elements of each of the examples.

In the case of Example 6, the wavelength used was 0.78 μm, whereas in the case of all the other examples, the wavelength used was 1.55 μm.

TABLE 1

| EXAMPLE | SPACING (d) | HEIGHT (H) | WIDTH (W) | CONDUCTOR | $\|\epsilon\|W(H/d)$ |
|---|---|---|---|---|---|
| 1 | 0.5(0.32 λ) | 1.5(3.0 d) | 0.1(0.2 d) | Au | 29.4 |
| 2 | 0.5(0.32 λ) | 1.5(3.0 d) | 0.5(1.0 d) | Au | 147.0 |
| 3 | 0.5(0.32 λ) | 5.0(10.0 d) | 0.1(0.2 d) | Au | 98.0 |
| 4 | 0.25(0.16 λ) | 1.5(3.0 d) | 0.1(0.2 d) | Au | 58.8 |
| 5 | 0.5(0.32 λ) | 1.5(3.0 d) | 0.1(0.2 d) | Al | 50.4 |
| 6 | 0.25(0.32 λ) | 0.75(3.0 d) | 0.05(0.2 d) | Al | 7.72 |
| 7 | 0.5(0.32 λ) | 1.5(3.0 d) | 0.1(0.2 d) | Ag | 22.1 |
| 8 | 0.5(0.32 λ) | 1.5(3.0 d) | 0.1(0.2 d) | Cu | 32.9 |
| 9 | 0.5(0.32 λ) | 1.5(3.0 d) | 0.05(0.1 d) | Au | 14.7 |
| 10 | 0.3(0.19 λ) | 0.3(1.0 d) | 0.1(0.3 d) | Al | 2.57 |

TABLE 2

| EXAMPLE | EXTINCTION RATIO [dB] | INSERTION LOSS [dB] | WAVELENGTH [μm] |
|---|---|---|---|
| 1 | 52.3 | 0.13 | 1.55 |
| 2 | 55.6 | 1.49 | 1.55 |
| 3 | 58.2 | 0.61 | 1.55 |
| 4 | 58.7 | 0.22 | 1.55 |
| 5 | 55.7 | 0.26 | 1.55 |
| 6 | 47.8 | 0.69 | 0.78 |
| 7 | 53.5 | 0.28 | 1.55 |
| 8 | 51.3 | 0.21 | 1.55 |
| 9 | 48.4 | 0.07 | 1.55 |
| 10 | 22.5 | 0.08 | 1.55 |

Example 1: In this example, a preferable material was used for the conductive bodies in the polarizing element and the shape parameters of the conductive bodies were selected to be in a preferable range, and hence a polarizing element having both a good extinction ratio and a good insertion loss was obtained Example 2: The width W of the conductive bodies was larger than in Example 1, and hence, although the extinction ratio was high, the insertion loss increased.

Example 3: The height H of the conductive bodies was larger than in Example 1, and hence a large extinction ratio was obtained. Moreover, even though H was made larger, the insertion loss increased only slightly.

Example 4: The spacing d between the conductive bodies was smaller than in Example 1, and hence a large extinction ratio was obtained. Moreover, because the width W was unchanged, the insertion loss increased only slightly.

It can be seen from Examples 1 to 4 above that good polarization characteristics were obtained even when wide-ranging changes were made to the shape parameters of the conductive bodies.

Example 5: The shape parameters of the conductive bodies were the same as in Example 1, but aluminum was used as the material of the conductive bodies. Even though aluminum was used, a polarizing element having excellent characteristics was obtained.

Example 6: A different wavelength (0.78 μm) to that used in the other examples (an optical communication wavelength of 1.55 μm) was used, but by changing the shape parameters to ones suitable for this new wavelength, excellent polarization characteristics were again obtained.

Examples 7, 8: The shape parameters of the conductive bodies were unchanged from Example 1, but the material of the conductive bodies was changed to silver or copper. Even so, excellent polarization characteristics were obtained as with when gold was used.

Example 9: The width W of the conductive bodies was lowered relative to Example 1, and hence an extremely low insertion loss was obtained. Moreover, the extinction ratio dropped only slightly.

Example 10: The shape parameters of the conductive bodies were not really within the best ranges, and moreover aluminum, which has a relatively low conductivity, was used. Even so, a polarizing element that could be put to practical use was obtained.

Comparative Examples 1 to 4

Using pieces of quartz glass of dimensions 100 mm×100 mm×2.1 mm as in Example 1, polarizing elements having conductive bodies of different types and shapes as shown in Table 3 were manufactured using the same procedure as in Example 1.

In Table 3, each of the predetermined spacing d, the height H, the width W and the parameter |ε|_W_(H/d) has the units µm.

Table 4 shows the characteristics (extinction ratio and insertion loss) of the polarizing elements of each of the comparative examples.

TABLE 3

| COMPARATIVE EXAMPLE | SPACING (d) | HEIGHT (H) | WIDTH (W) | CONDUCTOR | \|ε\|W(H/d) |
|---|---|---|---|---|---|
| 1 | 0.5(0.32 λ) | 0.25(0.5 d) | 0.1(0.2 d) | Au | 4.90 |
| 2 | 0.8(0.52 λ) | 1.5(2.0 d) | 0.1(0.13 d) | Au | 18.4 |
| 3 | 0.5(0.32 λ) | 0.15(0.3 d) | 0.05(0.1 d) | Al | 0.77 |
| 4 | 0.5(0.32 λ) | 1.5(3.0 d) | 0.8(1.6 d) | Au | 235 |

TABLE 4

| COMPARATIVE EXAMPLE | EXTINCTION RATIO [dB] | INSERTION LOSS [dB] | WAVELENGTH [µm] |
|---|---|---|---|
| 1 | 8.9 | 0.01 | 1.55 |
| 2 | 7.5 | 0.10 | 1.55 |
| 3 | 7.4 | 2.80 | 1.55 |
| 4 | 51.1 | 7.39 | 1.55 |

Comparative Example 1: The height H was low, and hence a sufficient extinction ratio could not be obtained.

Comparative Example 2: The spacing d between the conductive bodies was large relative to the wavelength used, and hence a sufficient extinction ratio could not be obtained.

Comparative Example 3: The shape parameters of the conductive bodies and the physical property value |ε| were not sufficiently well matched to one another, in particular the height H was too low, resulting in polarizing characteristics (both the extinction ratio and the insertion loss) not fit for practical use.

Comparative Example 4: The width W of the conductive bodies was large, and hence the insertion loss was extremely large.

INDUSTRIAL APPLICABILITY

As described in detail above, according to the polarizing element of the present invention, a plurality of thin-film-shaped conductive bodies are arranged on a surface of the transparent substrate and extending parallel to one another with a predetermined spacing therebetween and in a direction orthogonal to the surface of the transparent substrate. Insertion loss of incident light through scattering and absorption can thus be reduced, and hence good polarization characteristics can be obtained. Moreover, due to the simple structure, the polarizing element is inexpensive.

Moreover, according to the polarizing element of the present invention, the transparent substrate has a plurality of first recesses provided in a surface thereof, and the thin-film-shaped conductive bodies are embedded in these first recesses. The conductive bodies can thus be fixed in place, and moreover the conductive bodies do not separate away from the transparent substrate, and as a result stable polarization characteristics can be realized.

Furthermore, according to the polarizing element of the present invention, the thin-film-shaped conductive bodies are embedded in a plurality of second recesses formed in a dielectric uniformly provided on the surface of the transparent substrate. The conductive bodies can thus be fixed in place, and moreover the conductive bodies do not separate away from the transparent substrate, and as a result stable polarization characteristics can be realized.

Moreover, according to the polarizing element of the present invention, the conductive bodies are formed on side surfaces of the first recesses provided in the surface of the transparent substrate. The conductive bodies can thus be fixed in place, and moreover the conductive bodies do not separate away from the transparent substrate, and as a result stable polarization characteristics can be realized.

Furthermore, according to the polarizing element of the present invention, a dielectric covers the whole of both the surface of the transparent substrate and the thin-film-shaped conductive bodies. The conductive bodies are thus protected immovably by the dielectric, and hence do not break easily upon being subjected to various external forces during subsequent manufacturing steps such as machining and assembly.

Moreover, according to the polarizing element of the present invention, the polarizing element has a dielectric on the surface of the transparent substrate, the dielectric has formed therein a plurality of grooves extending parallel to one another with a predetermined spacing therebetween and in a direction orthogonal to the surface of the transparent substrate, and the thin-film-shaped conductive bodies are embedded in the grooves. The conductive bodies can thus be fixed in place, and moreover the conductive bodies do not separate away from the transparent substrate, and as a result stable polarization characteristics can be realized.

Furthermore, according to the polarizing element of the present invention, the following relationships are satisfied:

$$0.1\lambda \leq d < 0.5\lambda,$$

$$0.5d < H \leq 20d,$$

$$0.06d \leq W \leq 1.5d, \text{ and}$$

$$1.0\ \mu m \leq |\epsilon| \cdot W \cdot (H/d),$$

where d represents the predetermined spacing between the conductive bodies, H the height of the conductive bodies, W the width of the conductive bodies, |ε| the absolute value of the complex relative permittivity of the conductive bodies, λ the wavelength of the polarized light, and the units of d, W, H and λ are μm. As a result, yet better polarization characteristics can be obtained, with the extinction ratio being high and the insertion loss being low.

Preferably, according to the polarizing element of the present invention, the following relationships are additionally satisfied:

$$0.7d < H \leq 15d, \text{ and}$$

$$0.06d \leq W \leq 0.7d.$$

As a result, still better polarization characteristics can be obtained, with the extinction ratio being high and the insertion loss being low.

More preferably, according to the polarizing element of the present invention, the following relationships are additionally satisfied:

$$1.0d < H \leq 10d, \text{ and}$$

$$0.06d \leq W \leq 0.5d.$$

As a result, still better polarization characteristics can be obtained, with the extinction ratio being high and the insertion loss being low.

Furthermore, according to the polarizing element of the present invention, the conductive bodies comprise at least one selected from the group consisting of gold, silver, copper, palladium, platinum, aluminum, germanium, rhodium, silicon, nickel, cobalt, manganese, iron, chromium, titanium, ruthenium, niobium, neodymium, ytterbium, yttrium, molybdenum, indium and bismuth. By using such materials, conductive bodies having relatively high conductivity and relative permittivity can be obtained, and hence properties of reflection and absorption of incident light can be improved, and thus polarization characteristics can be further improved.

According to the method of manufacturing a polarizing element of the present invention, a polarizing element in which conductive bodies are embedded in a surface of a transparent substrate in a manner extending parallel to one another with a predetermined spacing therebetween can be manufactured. Insertion loss of light incident on the polarizing element due to scattering and absorption can thus be reduced, and hence good polarization characteristics can be obtained. Moreover, the manufacturing process is simple, and hence the polarizing element can be manufactured inexpensively.

The invention claimed is:

1. A polarizing element that absorbs a component of a specific wavelength from electromagnetic waves passing therethrough and thus produces polarized light, comprising:

a transparent substrate that has a plurality of first recesses formed in a surface of said transparent substrate and extending parallel to one another with a predetermined spacing therebetween in a direction orthogonal to said surface of said transparent substrate, and a plurality of second recesses formed in a dielectric material uniformly provided on said surface of said transparent substrate; and a thin-film-shaped conductive body embedded in each of said first and second recesses.

2. A polarizing element as claimed in claim 1, wherein said conductive bodies comprise at least one selected from the group consisting of gold, silver, copper, palladium, platinum, aluminum, germanium, rhodium, silicon, nickel, cobalt, manganese, iron, chromium, titanium, ruthenium, niobium, neodymium, ytterbium, yttrium, molybdenum, indium and bismuth.

3. The polarizing element as claimed in claim 1, further satisfying the relationships:

$$0.1\lambda \leq d < 0.5\lambda,$$

$$0.5d < H \leq 20d,$$

$$0.06d \leq W \leq 1.5d, \text{ and}$$

$$1.0\ \mu m \leq |\epsilon| \cdot W \cdot (H/d),$$

where d represents said predetermined spacing between said conductive bodies, H a height of said conductive bodies, W a width of said conductive bodies, |ε| an absolute value of a complex relative permittivity of said conductive bodies, and λ a polarized light wavelength, and units of d, W, and H are μm.

4. A polarizing element that absorbs a component of a specific wavelength from electromagnetic waves passing therethrough and thus produces polarized light, comprising:

a transparent substrate, a plurality of thin-film-shaped conductive bodies arranged on a surface of said transparent substrate and extending parallel to one another with a predetermined spacing therebetween and in a direction orthogonal to said surface of said transparent substrate, and a dielectric material disposed on said surface of said transparent substrate, said dielectric having formed therein a plurality of grooves extending parallel to one another with a predetermined spacing therebetween and in a direction orthogonal to said surface of said transparent substrate, said thin-film-shaped conductive bodies embedded in said grooves, and wherein the following relationships are satisfied:

$$0.1\lambda \leq d < 0.5\lambda,$$

$$0.5d < H \leq 20d,$$

$$0.06d \leq W \leq 1.5d, \text{ and}$$

$$1.0\mu m \leq |\epsilon| \cdot W \cdot (H/d),$$

where d represents said predetermined spacing between said conductive bodies, H a height of said conductive bodies, W a width of said conductive bodies, |ε| an absolute value of a complex relative permittivity of said conductive bodies, and λ a polarized light wavelength, and units of d, W, and H are μm.

5. The polarizing element as claimed in claim 4, further satisfying the relationships:

$0.7d < H \leq 15d$, and $0.06d \leq W \leq 0.7d$.

6. The polarizing element as claimed in claim 4, further satisfying the relationships:

$1.0d < H \leq 10d$, and $0.06d \leq W \leq 0.5d$.

7. The polarizing element as claimed in claim 4, wherein said conductive bodies comprise at least one selected from the group consisting of gold, silver, copper, palladium, platinum, aluminum, germanium, rhodium, silicon, nickel, cobalt, manganese, iron, chromium, titanium, ruthenium, niobium, neodymium, ytterbium, yttrium, molybdenum, indium and bismuth.

8. A polarizing element that absorbs a component of a specific wavelength from electromagnetic waves passing therethrough and thus produces polarized light, comprising:
  a transparent substrate that has a plurality of first recesses formed in a surface of said transparent substrate and extending parallel to one another with a predetermined spacing therebetween in a direction orthogonal to said surface of said transparent substrate; and
  a thin-film-shaped conductive body embedded in each of said first recesses,
  wherein the following relationships are satisfied:

$0.1\lambda \leq d < 0.5\lambda$, $0.5d < H \leq 20d$, $0.06d \leq W \leq 1.5d$, and $1.0 \, \mu m \leq |\epsilon| \cdot W \cdot (H/d)$, where d represents said predetermined spacing between said conductive bodies, H a height of said conductive bodies, W a width of said conductive bodies, $|\epsilon|$ an absolute value of a complex relative permittivity of said conductive bodies, and $\lambda$ a polarized light wavelength, and units of d, W, and H are $\mu m$.

9. The polarizing element as claimed in claim 8, further satisfying the relationships:

$0.7d < H \leq 15d$, and $0.06d \leq W \leq 0.7d$.

10. The polarizing element as claimed in claim 8, further satisfying the relationships:

$1.0d < H \leq 10d$, and $0.06d \leq W \leq 0.5d$.

11. A method of manufacturing a polarizing element that absorbs a component of a specific wavelength from electromagnetic waves passing therethrough and thus produces polarized light, comprising:
  a first undulating structure forming step of forming, in a surface of a transparent substrate, a first undulating structure having a plurality of linear first recesses extending parallel to one another with a predetermined spacing therebetween;
  a second undulating structure forming step of depositing a dielectric to an approximately uniform thickness onto said first undulating structure using a liquid phase deposition method, thus forming a second undulating structure having a plurality of second recesses having a width narrower than a width of said first recesses; and
  a conductor embedding step of embedding a conductor into said second recesses.

12. The method of manufacturing a polarizing element as claimed in claim 11, wherein said liquid phase deposition method in said second undulating structure forming step comprises bringing said first undulating structure into contact with a hydrosilicofluoric acid solution in which silicon dioxide has been dissolved to a supersaturated extent, thus depositing silicon dioxide on a surface of said first undulating structure.

* * * * *